United States Patent
Schwarz et al.

(10) Patent No.: US 12,504,052 B2
(45) Date of Patent: Dec. 23, 2025

(54) VIBRATION DAMPER HAVING A GAS-FILLED ENVELOPING BODY

(71) Applicant: ZF FRIEDRICHSHAFEN AG, Friedrichshafen (DE)

(72) Inventors: Alexander Schwarz, Thuengen (DE); Bernd Göllner, Prichsenstadt (DE); Peter Neckermann, Sommerach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 406 days.

(21) Appl. No.: 18/204,122

(22) Filed: May 31, 2023

(65) Prior Publication Data

US 2023/0392664 A1 Dec. 7, 2023

(30) Foreign Application Priority Data

Jun. 1, 2022 (DE) ...................... 10 2022 205 562.4

(51) Int. Cl.
  *F16F 9/092* (2006.01)
  *F16F 9/02* (2006.01)
  *F16F 9/32* (2006.01)
(52) U.S. Cl.
  CPC .............. *F16F 9/3235* (2013.01); *F16F 9/02* (2013.01); *F16F 2230/0023* (2013.01)
(58) Field of Classification Search
  CPC .. F16F 9/3235; F16F 9/02; F16F 9/185; F16F 9/092; F16F 2230/0023
  See application file for complete search history.

(56) References Cited

U.S. PATENT DOCUMENTS

| | | | | |
|---|---|---|---|---|
| 4,702,356 A | * | 10/1987 | Katz | F16F 9/092 188/315 |
| 5,465,944 A | * | 11/1995 | Page | F16F 9/092 267/64.23 |
| 7,025,184 B2 | * | 4/2006 | Baba | B60G 17/044 188/315 |
| 7,568,562 B2 | * | 8/2009 | Beck | F16F 9/092 188/313 |
| 8,533,924 B2 | * | 9/2013 | Ackermann | B29D 22/023 72/60 |

(Continued)

FOREIGN PATENT DOCUMENTS

| | | |
|---|---|---|
| DE | 4131532 | 3/1993 |
| DE | 10104358 | 10/2002 |

(Continued)

OTHER PUBLICATIONS

Office Action of corresponding German Patent Application No. 10 2022 205 562.4.

*Primary Examiner* — Thomas W Irvin
(74) *Attorney, Agent, or Firm* — COZEN O'CONNOR

(57) ABSTRACT

Vibration damper, having a working cylinder filled with damping medium which with an outer lateral surface and an intermediate tube arranged on the lateral surface forms a fluid channel. The working cylinder forms with an outer container tube an annular space which functions as a compensation chamber and in which an enveloping body having a gas filling is arranged. The intermediate tube is designed with a mounting protection element which at least partially covers an end face of the intermediate tube opposed to a mounting direction of the enveloping body.

10 Claims, 4 Drawing Sheets

(56) References Cited

U.S. PATENT DOCUMENTS

| | | | |
|---|---|---|---|
| 2005/0051398 A1* | 3/2005 | Baba | B60G 17/044 |
| | | | 188/315 |
| 2006/0096820 A1* | 5/2006 | Beck | F16F 9/092 |
| | | | 188/322.16 |
| 2007/0210496 A1* | 9/2007 | Beck | F16F 9/092 |
| | | | 267/140.4 |
| 2024/0418234 A1* | 12/2024 | Beilner | F16F 9/43 |

FOREIGN PATENT DOCUMENTS

| | | |
|---|---|---|
| DE | 10320005 | 10/2004 |
| DE | 102005048742 | 4/2007 |
| DE | 102015218296 | 3/2016 |
| DE | 102015205447 | 9/2016 |
| DE | 102020201457 | 8/2021 |
| DE | 102021201119 | 2/2022 |
| KR | 20050104250 | 11/2005 |
| KR | 20180065283 | 6/2018 |

\* cited by examiner

VIBRATION DAMPER HAVING A GAS-FILLED ENVELOPING BODY

BACKGROUND OF INVENTION

1. Field of the Invention

The disclosure relates to a vibration damper having a gas-filled enveloping body.

2. Description of the Related Art

DE 10 2020 201 457 A1 discloses an adjustable vibration damper that has an intermediate tube which, together with a cylinder, forms a fluidic connection between a working chamber on the piston rod side and an adjustable damper valve device. The intermediate tube has terminal guide portions having an encapsulated gasket, wherein the intermediate tube is fixed to the cylinder by frictional engagement by way of the guide portions.

Such a vibration damper is also equipped with a gas-filled enveloping body corresponding to the design according to DE 10 2015 218 296 A1. The production and mounting of such an intermediate tube has disadvantages. In addition, it is also necessary to proceed very cautiously when mounting the enveloping body inside a compensation chamber so as not to damage its comparatively thin shell.

SUMMARY OF THE INVENTION

An object of the present disclosure consists in simplifying the use of a gas-filled enveloping body in a vibration damper.

The intermediate tube is designed with a mounting protection element that at least partially covers an end face of the intermediate tube opposed to a mounting direction of the enveloping body.

An advantage of one aspect of the invention is that the intermediate tube can be designed solely for the function as an intermediate tube. An intermediate tube with a constant cross section can be used, which is significantly less expensive than the design known from the prior art.

The mounting protection element is preferably formed by a cap that is separate from the intermediate tube. The mounting protection element only has to withstand the mechanical load present during mounting.

With regard to a simple design and the aim of being able to use a simple working cylinder, the mounting protection element is fixed to the outer lateral surface of the working cylinder by force-based engagement.

For sufficient inherent stability, the mounting protection element has a rib structure on the inside.

The rib structure additionally offers the possibility that it is provided with clamping surfaces with respect to the outer lateral surface of the working cylinder. As a result, greater size tolerances can also be introduced in the working cylinder without excessive stresses occurring in the mounting protection element.

A further measure for a simple design consists in that an axial connection between the mounting protection element and the intermediate tube is in the form of a butt joint. Consequently, a thin-walled intermediate tube can also be used, since no particular connecting profile with the mounting protection element is necessary.

According to an advantageous aspect, the mounting protection element has at the transition to the intermediate tube the same outside diameter as the intermediate tube. The mounting protection element can have, for example, a conical or also a spherical basic shape. With this dimensioning of the outside diameter, an obstruction at the transition is avoided.

The mounting protection element preferably has a closed surface structure in the circumferential region of a sliding surface for the enveloping body. With the closed surface structure, that is to say there are no grooves, channels, webs or the like, frictional contact between the enveloping body and the mounting protection element that is as gentle as possible is to be achieved.

On mounting of the vibration damper, air inclusions within the vibration damper sometimes occur. Therefore, an annular space enclosed by the mounting protection element is connected to the compensation chamber by way of at least one connection opening. During operation of the vibration damper, the air inclusions, which are then present in the compensation chamber, can be discharged by way of the working chamber by the recirculation operations between the compensation chamber and the working chamber.

In order that the air inclusions are transported away as quickly and as reliably as possible, the mounting protection element is provided at both ends with at least one connection opening. The annular space can thus be flushed by the damping medium set in motion in the compensation chamber by the flow between the connected working chamber and the compensation chamber, whereby air inclusions are discharged from the annular space.

BRIEF DESCRIPTION OF THE DRAWINGS

The invention will be explained in greater detail with reference to the following description of the figures, wherein.

DETAILED DESCRIPTION OF THE PRESENTLY PREFERRED EMBODIMENTS

Figure 1:
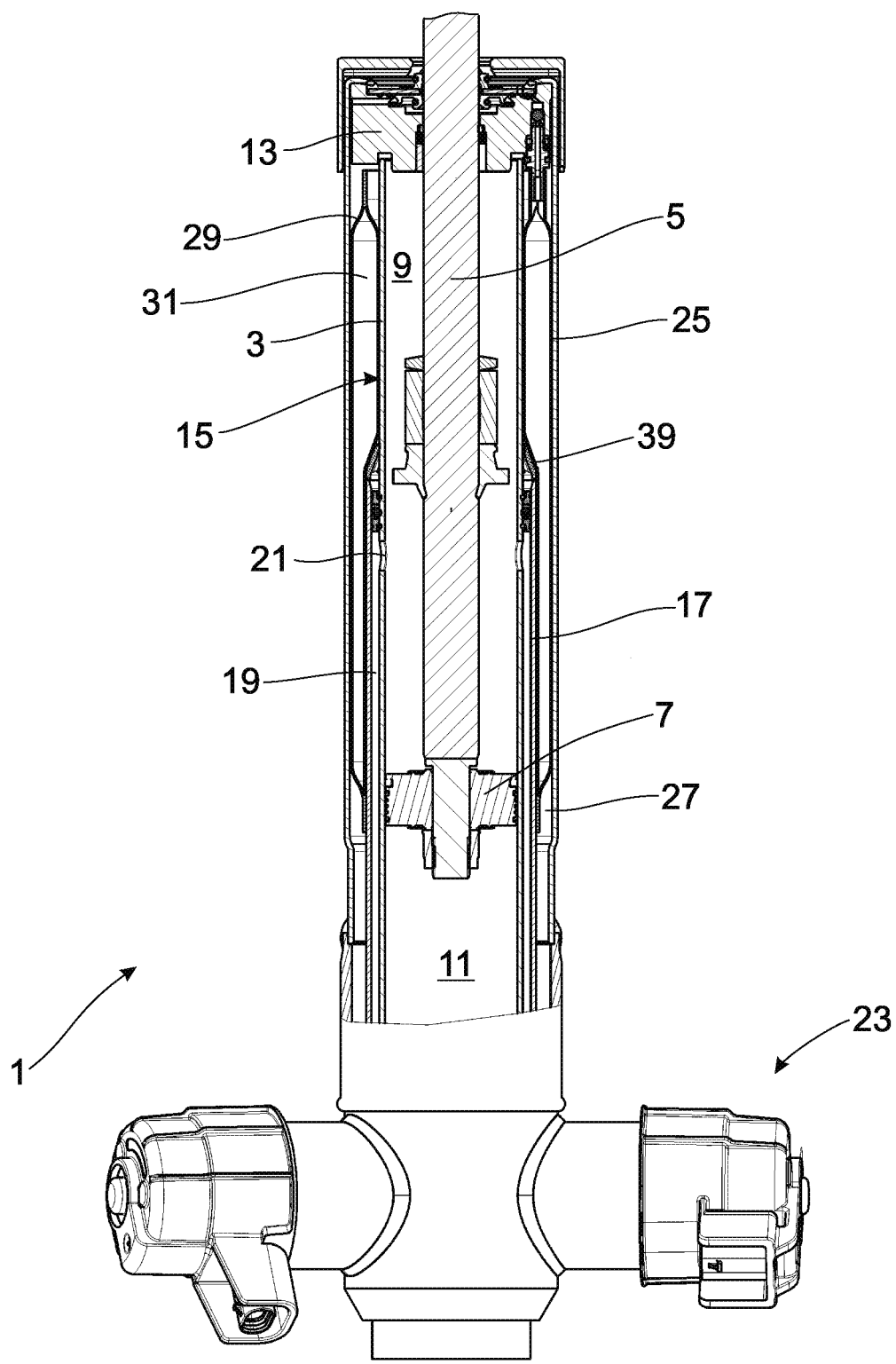
FIG. 1 is a section through a vibration damper.

FIG. 1 shows by way of example a vibration damper 1 having a working cylinder 3 filled with damping medium. In the working cylinder 3, a piston rod 5 having a piston 7 is guided in an axially movable manner. The piston 7 divides the working cylinder 3 into a working chamber 9 on the piston rod side and a working chamber 11 remote from the piston rod. Depending on the desired function of the vibration damper 1, the piston 7 can be designed as a closed displacement body, with at least one pressure relief valve or also with damper valves known per se. The working chamber on the piston rod side 9 is closed at the end by a piston rod guide 13.

An outer lateral surface 15 of the working cylinder 3 and an intermediate tube 17 arranged on the lateral surface 15 form a fluid channel 19. The fluid channel 19, by way of at least one connecting opening 21, can serve as a flow connection between the working chamber 9 on the piston rod side and an adjustable damper valve device 23, but also for a connection with the working chamber 11 remote from the piston rod 5 or with a bottom valve (not shown). The specific function of the fluid channel 19 is not important for the present disclosure.

Furthermore, the working cylinder 3 forms with an outer container tube 25 an annular space which functions as a compensation chamber 27 for the damping medium volume displaced by the piston rod 5. The piston rod guide 13 also closes the compensation chamber 27 at the end and is sealingly connected to the container tube 25.

The compensation chamber 27 is filled with a damping medium volume and additionally holds an enveloping body 29 having a gas filling 31. The gas filling 31 maintains the damping medium volume under compressive prestress in order to minimize foaming of the damping medium.

Figure 2:
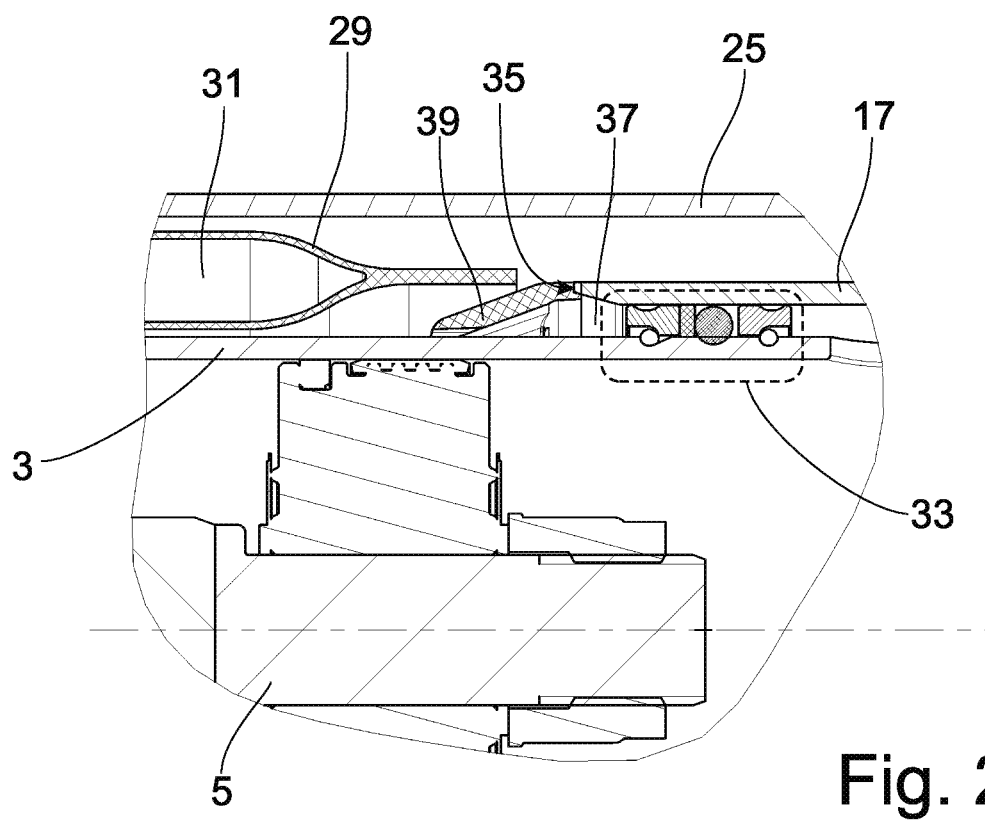
FIGS. 2 and 3 are detailed representations relating to the mounting process.

The intermediate tube 17 is in the form of a rigid tubular body, the open end of which facing in the direction of the piston rod guide 13 is closed by a sealing-guiding unit 33. Owing to the operating pressures that occur, the intermediate tube frequently consists of a metallic material. The choice of material is, however, likewise not relevant for the invention. The sealing-guiding unit 33 is located at an axial distance from a terminal end face 35 of the intermediate tube 17. So that there is a short annular space 27 between the intermediate tube 17 and the working cylinder 3, as shown in the detailed representation according to FIGS. 2 and 3.

The intermediate tube 17 is designed with a mounting protection element 39, which at least partially covers the end face 35 of the intermediate tube 17 opposed to a mounting direction of the enveloping body 29. Specifically, the mounting protection element is oriented in the direction of the piston rod guide 13. The mounting protection element 39 is formed by a cap that is separate from the intermediate tube 17.

The mounting protection element 39 is fixed to the outer lateral surface 15 of the working cylinder 3 by force-based engagement and is located wholly within the damping medium volume inside the compensation chamber 27. The pressure level inside the compensation chamber 27 is significantly lower than the peak pressure within the intermediate tube 17, so that the mounting protection element 39 can be formed of a plastics material without any problems.

The mounting protection element 39 has at the transition to the intermediate tube 17 the same outside diameter as the intermediate tube 17. An axial connection between the mounting protection element 39 and the intermediate tube 17 is in the form of a butt joint. The mounting protection element 39 likewise bears against the working cylinder 3 with a minimal end face, so that a conical basic shape is obtained. A spherical contour or also a hollow profile can also be provided. The mounting protection element 39 has in the circumferential region a sliding surface 41 for the enveloping body 29. This sliding surface 41 in turn has a closed surface structure in order to ensure the best possible sliding property.

Figure 4:
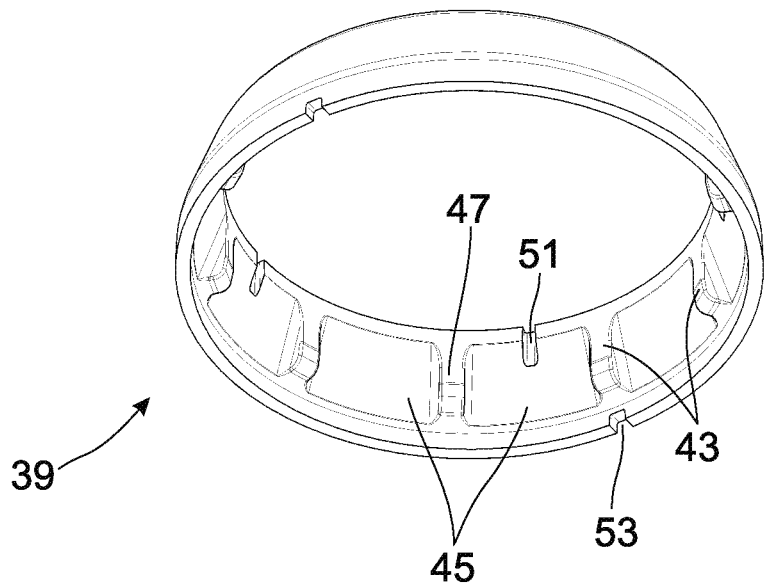
FIGS. 4 and 5 are a mounting protection element in different views.
Figure 5:
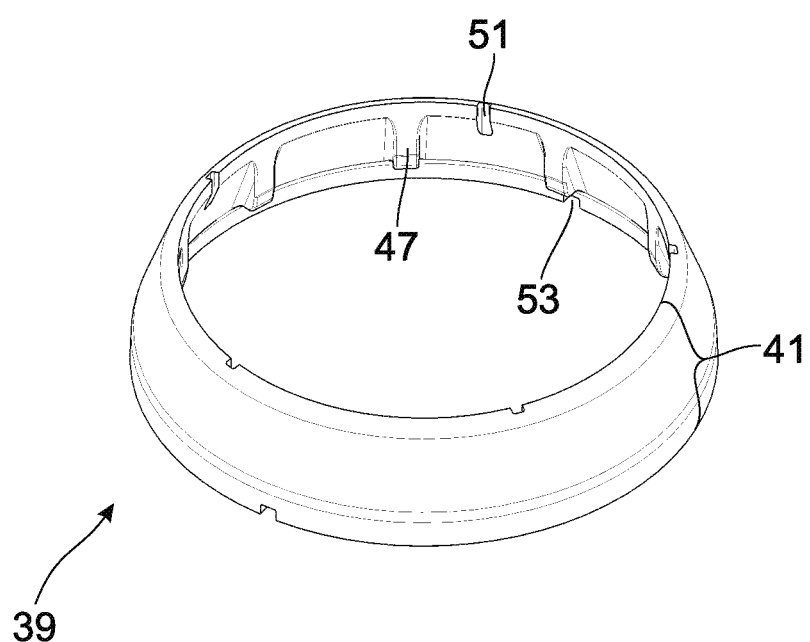

As is shown by the overview of FIGS. 4 and 5, the mounting protection element 39 has a rib structure 43 on the inside. The rib structure 43 extends over the entire circumference and is limited axially to a length portion. With the rib structure 43, there are zones 45 between the adjacent ribs which ensure a certain elasticity of the mounting protection element 39, so that a certain out-of-roundness of the working cylinder 3 can be compensated for. In addition, the rib structure 43 is provided with clamping surfaces 47 with respect to the outer lateral surface 15 of the working cylinder 3.

An annular space 49 enclosed by the mounting protection element 39 is connected to the compensation chamber 27 by way of at least one connection opening 51; 53. The annular space 49 is connected to the annular space 37. The mounting protection element is preferably provided with at least one connection opening 51; 53 at both ends. The connection openings 51; 53 are formed by axial grooves relative to the working cylinder and radial grooves relative to the intermediate tube 17.

Figure 6:
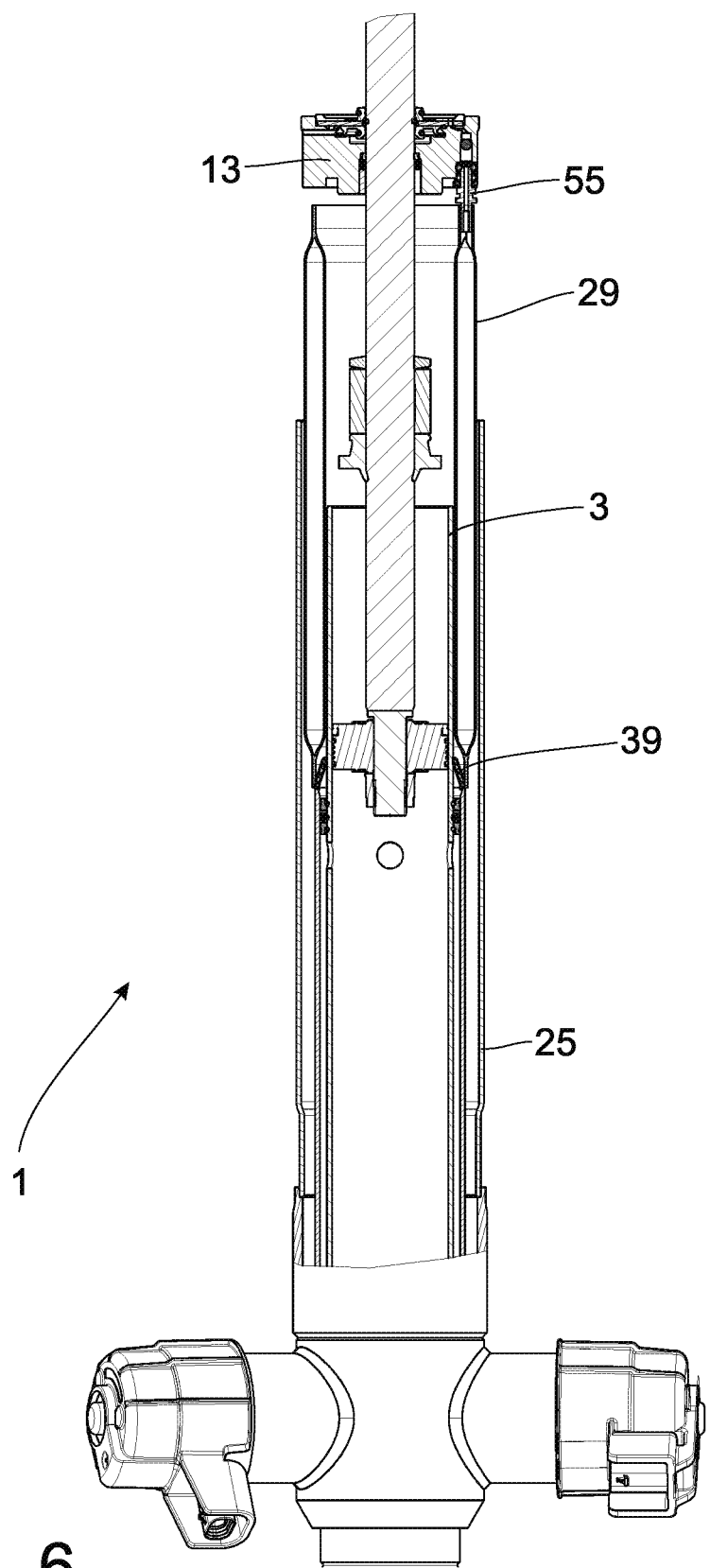
FIG. 6 is a section through the vibration damper in a mounted state.

FIG. 6 shows the vibration damper 1 according to FIG. 1 during the mounting process. The container tube 25 and the working cylinder 3 have not yet been connected to the piston rod guide 13. The position of the enveloping body 29 relative to the intermediate tube 17 corresponds to the representation according to FIG. 3. The enveloping body 29 is connected to the piston rod guide by way of a filling connection 55.

Figure 3:
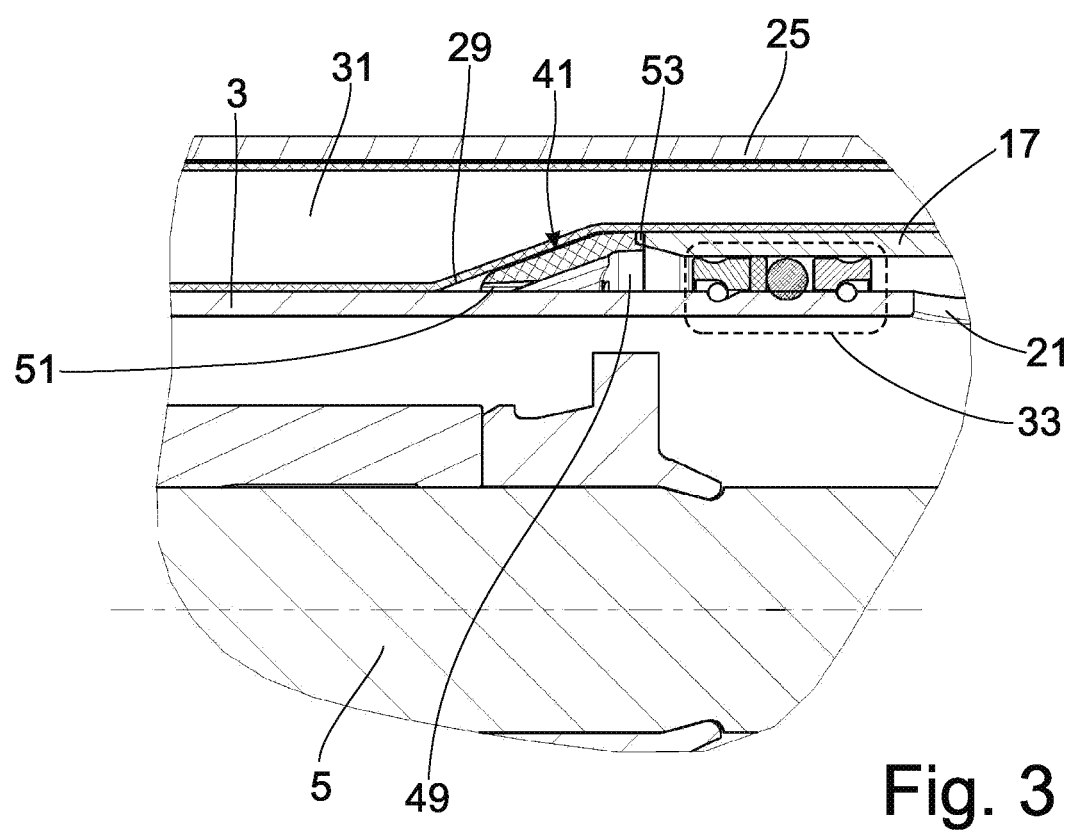

During a further mounting movement, the enveloping body 29 slides over the mounting protection element 39 deeper into the compensation chamber 27. When mounting is complete, the enveloping body 29 continues to bear against the mounting protection element 39, as shown in FIGS. 1 and 3. The connection openings 51; 53 remain at least partially open and permit degassing of the annular space 49 of the mounting protection element 39.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto

The invention claimed is:

1. A vibration damper, comprising:
an outer container tube;
a mounting protection element;
a working cylinder filled with damping medium which with an outer lateral surface;
an intermediate tube arranged on the outer lateral surface that forms a fluid channel;
an annular space configured as a compensation chamber in which an enveloping body having a gas filling is arranged, the annular space being formed by the working cylinder and the outer container tube;
wherein the intermediate tube is designed with the mounting protection element which at least partially covers an end face of the intermediate tube opposed to a mounting direction of the enveloping body.

2. The vibration damper as claimed in claim 1, wherein the mounting protection element is a cap that is separate from the intermediate tube.

3. The vibration damper as claimed in claim 1, wherein the mounting protection element is fixed to the outer lateral surface of the working cylinder by force-based engagement.

4. The vibration damper as claimed in claim 1, wherein the mounting protection element has a rib structure on an inside.

5. The vibration damper as claimed in claim 4, wherein the rib structure comprises a clamping surfaces with respect to the outer lateral surface of the working cylinder.

6. The vibration damper as claimed in claim 1, wherein an axial connection between the mounting protection element and the intermediate tube is a butt joint.

7. The vibration damper as claimed in claim 1, wherein the mounting protection element has at a transition to the intermediate tube a same outside diameter as the intermediate tube.

8. The vibration damper as claimed in claim 1, wherein the mounting protection element has a closed surface structure in a circumferential region of a sliding surface for the enveloping body.

9. The vibration damper as claimed in claim 1, wherein an annular space enclosed by the mounting protection element is connected to the compensation chamber by at least one connection opening.

10. The vibration damper as claimed in claim 9, wherein the mounting protection element is provided at each end with a respective at least one connection opening.

\* \* \* \* \*